United States Patent
Fujimori

(10) Patent No.: US 7,319,694 B2
(45) Date of Patent: Jan. 15, 2008

(54) COMMUNICATION APPARATUS AND NETWORK SYSTEM HAVING RAPID DIGITAL INTERFACE

(75) Inventor: Junichi Fujimori, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1033 days.

(21) Appl. No.: 10/345,668

(22) Filed: Jan. 15, 2003

(65) Prior Publication Data

US 2003/0140154 A1  Jul. 24, 2003

(30) Foreign Application Priority Data

Jan. 18, 2002  (JP)  ............... 2002-010272

(51) Int. Cl.
*H04L 12/50* (2006.01)

(52) U.S. Cl. .................................... 370/363

(58) Field of Classification Search ............... 370/469, 370/362, 363, 364, 365, 422, 423, 419
See application file for complete search history.

(56) References Cited

U.S. PATENT DOCUMENTS

| | | | |
|---|---|---|---|
| 5,652,400 A * | 7/1997 | Fujimori et al. | 84/600 |
| 5,825,752 A * | 10/1998 | Fujimori et al. | 370/260 |
| 5,842,032 A | 11/1998 | Bertsch et al. | |
| 6,199,136 B1 | 3/2001 | Shteyn | |
| 7,009,942 B2 * | 3/2006 | Fujimori et al. | 370/254 |
| 2001/0021188 A1 * | 9/2001 | Fujimori et al. | 370/389 |
| 2002/0051460 A1 * | 5/2002 | Galbi et al. | 370/412 |
| 2003/0018819 A1 * | 1/2003 | Fujimori | 709/249 |

FOREIGN PATENT DOCUMENTS

| | | |
|---|---|---|
| EP | 0 930 747 | 7/1999 |
| EP | 0 930 747 A | 7/1999 |
| JP | 11-163912 | 6/1999 |

OTHER PUBLICATIONS

On-The-Go Supplement to the USB Specification, Revision 1.0 (Dec. 18, 2001).*
F. Halsall, "The Open Systems Interconnections (OSI) Seven-Layer Model", Communications Handbook, 1997, pp. 567-576.
S. Lam, "Cebus Based Multi-Room Audio-Video Systems", Consumer Electronics, 1993, Digest of Technical Papers, IEEE 1993, pp. 150-151.

(Continued)

*Primary Examiner*—Kwang Bin Yao
*Assistant Examiner*—Nick Deichmeister
(74) *Attorney, Agent, or Firm*—Morrison & Foerster LLP

(57) ABSTRACT

Dominated nodes A, B and C equip only with lower layers 1*a*, 2*a* and 3*a*, and upper layers for the lower layers are not equipped. Each of the lower layers 1*a*, 2*a* and 3*a* comprises a preset device, and managing information for managing a communication function of the lower layer is read from the preset device and set to a function device of the lower layer. The dominated nodes A, B and C can execute isochronous transmission without a dominating node equipped with an upper layer for managing the lower layers. The dominating node is not always necessary on an IEEE1394 bus.

10 Claims, 6 Drawing Sheets

OTHER PUBLICATIONS

Mishina, T., Field Network Interface <TPC-161> for FA Controller µ-GPCH, Japan Electric Manufacturers' Association, 1995, vol. 1.
Miyazaki, Hitoshi, Computer Network Understand Hardware of Ethernet -from History of Computer Networks to Makine a LAN Borad, IEEE, Transistor Gitjutsu, SPECIAL Jan. 1, 2002, No. 77:51.

Steve Lam, "CEBUS Based Multi-Room Audio-Video Systems", IEEE, 1993, pp. 150-151.

Halsall, F., "The Open Systems Interconnections (OSI) Seven-Layer Model", Communications Handbook, XX, XX, 1997, pp. 567-576.

* cited by examiner

COMMUNICATION APPARATUS AND NETWORK SYSTEM HAVING RAPID DIGITAL INTERFACE

CROSS REFERENCE TO RELATED APPLICATION

This application is based on Japanese Patent Application 2002-010272, filed on Jan. 18, 2002, the entire contents of which are incorporated herein by reference.

BACKGROUND OF THE INVENTION

A) Field of the Invention

The present invention relates to a communication apparatus equipped with a high-speed data transfer interface and to a digital network system including the communication apparatus.

B) Description of the Related Art

IEEE 1394 Standard published by the Institute of Electrical and Electronics Engineers is known as a serial bus interface standard which can execute a voluminous and rapid digital data transmission. The IEEE 1394 is a high-speed serial interface which has a transmission speed of 100 Mbps, 200 Mbps and 400 Mbps and can transmit a plurality of compressed (encoded) motion picture files such as a MPEG-2 and the like at the same time or an uncompressed (unencoded) motion picture file. Each apparatus that equips with the interface (hereafter called IEEE 1394 device) compliant with the IEEE 1394 Standard performs as one node in the network system. In the IEEE 1394, an isochronous transmission for real time data transmission and an asynchronous transmission for an asynchronous (non-real time) data transmission are supported. That is, the real time data that is a performance data, such as motion picture, voice sound, or MIDI data and the like, is transmitted by using the isochronous transmission, and a non-real data such as a controlling command and a still picture is transmitted by using the asynchronous transmission.

An example of protocol that is compared to an open system interconnection (OSI) referring model of the IEEE 1394 is shown in FIG. 9. The protocol shown in FIG. 9 is defined as a protocol structure based on the "mLAN" (trade-mark) standard. The mLAN standard is connection management technology relating to a music data digital network for music performance data and audio data, the technology using the IEEE 1394 Standard.

As shown in FIG. 9, a protocol stack of the IEEE 1394 is divided into a lower layer and an upper layer, and the lower layer is constituted of four layers of a physical layer, a link layer, a transaction layer and a serial bus management.

The physical layer is a layer for executing a signal process between a transmitted/received electric signal and the link layer. The physical layer regulates a physical interface such as a connector, a cable and the like, an electric interface such as an encoding/decoding which executes an analogue/digital conversion of a logical signal used in the link layer and a signal level which determines an electric level of a communication signal and executes an arbitration for determination of a communication node, resynchronization of a communication clock, initializing detection of the bus and the like. As in the above, the physical layer regulates the physical interface and the electric interface and is generally made of hardware.

The link layer is a layer for executing a signal process between the physical layer and the transaction layer, and it executes an address assignment, a data check, a packet transmission that performs flame distribution of data and a cycle control. In the link layer, the packet transmission service called sub-action and a packet handler that is a packet transmission/reception service are provided. The link layer is also generally made of hardware as same as the physical layer. Also, in the link layer, services concerning to the asynchronous transmission and the isochronous transmission are provided. In the isochronous transmission, processes of the isochronous data such as an audio signal, a video signal and the like are executed not through the transaction layer.

The transaction layer is a layer for executing a signal process between an upper application and the link layer, and it executes a process concerning to the asynchronous transmission. In the transaction layer, one communication process for designated node and address is executed with transmitting a request packet and receiving a response packet by using the process executed by the link layer. Also, a communication process wherein a request packet is received from other node and a response packet is transmitted to the other node is executed. Moreover, the transaction is a data transmission of a request-response type. There are three transaction types, namely, a read transaction, a write transaction and a lock transaction. The read transaction is a transaction used for reading data from a specific target address space. The write transaction is a transaction used for writing data in a specific target address space. The lock transaction is a transaction used for renewing data in a specific target address space in accordance with reference data.

The bus management is a module for intensively managing resources on the serial bus. The bus management includes management of power supplies, management of a topology map and a speed map, management of isochronous resources, and the like. The bus management includes a configuration ROM, a control and status register (CSR) and the like.

As a constitution of a typical communication layer, the physical layer and the link layer are constituted of hardware, and the transaction layer and the bus management are constituted of firmware.

The upper layer is software for managing the lower layer and the whole node, and is constituted of, for example, the 1394AV protocols (IEC-61883) and mLAN upper layer. The AV protocols define a common isochronous packet (CIP) format for expressing the data contents of an isochronous packet, a connection management protocol (CMP) for managing connections by defining a virtual "plug", a function control protocol (FCP) for managing other devices connected to the IEEE1394 bus, and the like.

The mLAN upper layer is a protocol layer for transmission of audio/music information in accordance with the IEEE 1394 Standard. The mLAN upper layer is constituted of an audio/music information transmission protocol and a connection management protocol both complied with the 1394AV protocols. The audio/music information transmission protocol is used for adding the format for transmitting audio/music information to the definition of CIP. The connection management protocol is used for performing autonomous connection management of each node by using an intelligent CMP.

Also, an AV device protocol that has a typical IEEE 1394 bus is represented with a protocol shown in FIG. 10.

In this protocol structure, each structure is represented by classifying into the lower layer and the upper layer, and into a control system and a signal system. A control type lower layer is formed of the physical layer described before, the asynchronous transmission function provided on the link layer, a read/write transaction based on the asynchronous transmission provided on the transaction layer by using the function of the link layer and the bus management. Also, a control system upper layer is formed of audio/video control (AV/C) model, and a memory read/write based on the asynchronous transmission and a data exchanging function by an asynchronous stream are realized by a controlling lower and upper layer. Moreover, since the control system upper layer has a complicated function, it is general to be equipped with software executed by a CPU.

On the other hand, the signal system is formed of only the lower layer, and the lower layer is formed of the physical layer as described before, the isochronous transmission function provided on the link layer and the packet handler provided on the link layer. The signal system having this structure is a part dealing with an audio signal and a video signal by the isochronous transmission, and it is general to be equipped with hardware because a rapid transaction is needed.

It is approved implicitly that a device having the IEEE 1394 interface equips, as one independent IEEE 1394 node, with both of the IEEE 1394 bus protocol (the lower layer) and thereon a protocol (the upper layer) such as a device control, the isochronous transmission control and the like. In this case, since the upper layer has more complicated function than the lower layer, it equips with software executed by the CPU, and a manufacture cost rises if all the protocol stacks are used. In this case, for example, a powered speaker that is unnecessary to have a complicated user interface and should be cheap needs to be equipped with all the protocol stacks in order to be equipped with the IEEE1394 interface. Therefore, the manufacture cost rises unwillingly.

The applicant of the present invention suggested a network system adopting an IEEE 1394 bus that can solve the problem of the rise of the manufacturing cost in Japanese Patent Application 2001-220895. An example of the network system structure according to the prior art is shown in FIG. 11.

As shown in FIG. 11, the IEEE 1394 bus constituting the network system connects to a dominated node (a node A) equipped only with a lower layer 101a, a dominated node (a node B) equipped only with a lower layer 101b, a dominating node (a node C) that equips an upper layer 102c managing the lower layer 101c, the dominated node A and B together, and a general node (a node D) equipped with a lower layer 101d and an upper layer 102d. In this case, these nodes are physically connected with each another by a daisy chain connection or a tree connection with IEEE 1394 cables. The lower layers 101a to 101c are equivalent to the lower layer shown in FIG. 10, and the upper layer 102c and 102d are, for example, equivalent to the upper layer shown in FIG. 10.

The dominated nodes (the node A and the node B), the dominating node (the node C) and the general node (the node D) may be one of IEEE 1394 devices such as an electric musical instrument, an audio device, an audio/visual (AV) device, a personal computer an external storage device of various types and the like, each having an IEEE1394 interface. The dominated node 3a has no upper layer that manages the lower layer, but it is provided with only the lower layer. Since the dominated node 3a does not have an upper layer, the dominated nodes (node A and node B) themselves cannot normally communicate with the general node (node D) by using a protocol defined by the upper layer. That is, the dominated nodes (node A and node B) having no upper layer cannot process, by themselves, a command based on the 1394AV protocol and a command based on the mLAN standard of which commands are processed by the upper layer.

Since various transactions, the isochronous transmission and the like are processed by the lower layer, the dominated nodes (node A and node B) can process them by themselves. For example, if the dominated node A is a powered speaker, voice signals and the like to be reproduced are transmitted through the isochronous transmission so that they can be processed only by the lower layer. However, connection setting of a reception channel, volume control and the like cannot be processed by the dominated nodes (node A and node B) by themselves with only the lower layer, because a command is received by the upper layer and the upper layer writes data in a function register in the lower layer corresponding to the command by analyzing the command. In a system shown in FIG. 11, communication by the protocol defined by the upper layer can be executed in the dominated odes (node A and node B) by transaction of the upper layer 102c in the dominating node (node C) as an upper layer by proxy of the dominated nodes (node A and node B).

That is, the upper layer of the dominating node (node C) is the upper layer A and the upper layer B for managing the lower layer 101a and 101b of the dominated nodes (node A and node B) in addition to the upper layer C for managing own lower layer. The upper layer 102c is used as the proxy of the upper layer of the dominated nodes (node A and node B), and compatibility of an upper protocol of the dominated nodes (node A and node B) can be maintained. As the result, the dominated nodes (node A and node B) can communicate with the general node (node D) by using the protocol defined by the upper layer.

In the network system shown in FIG. 11, if the upper layer in the dominated nodes (node A and node B) is omitted, the system can maintain a compatibility of the upper protocol, and the dominated nodes (node A and node B) are supplied in a low price. Since the upper layer in the dominating node (node C) has the upper layer in the dominated nodes (node A and node B) together, the structure of the upper layer is complicated, and so it causes that the dominating node (node C) becomes a high price.

Also, there are some cases wherein a compatibility of the upper protocol is not necessary to be assured depending on the applications. In this case, there is a problem that a high-price dominating node is provided although the dominating node is not necessary.

SUMMARY OF THE INVENTION

It is an object of the present invention to provide a communication apparatus and a network system that normally do not need a dominating node.

According to one aspect of the present invention, there is provided a communication apparatus as a node and connected to a serial bus constituting a communication network, comprising: a lower layer of a network protocol that communicates with other node connected to the communication network via the serial bus; an application that transmits/receives data to/from other application of the other node by using the lower layer; a preset device that stores management information for managing the lower layer; and a setting device that enables the application to communicate with the other application of the other node without an upper layer of the network protocol by setting the lower layer with the managing information read from the preset device at the time of a configuration of the communication network.

According to another aspect of the present invention, there is provided a communication network system, comprising: a serial bus; and a plurality of dominated nodes connected to the serial bus, each dominated node comprising a lower layer of a network protocol, an application that transmits/receives data to/from other application of the other dominated node by using the lower layer, a preset device that stores management information for managing the lower layer, and a setting device that enables the application to communicate with the other application of the other dominated node without an upper layer of the network protocol by setting the lower layer with the managing information read from the preset device at the time of a configuration of the communication network.

According to still another aspect of the present invention, there is provided a communication network system, comprising: a serial bus; a general node being capable of connecting to the serial bus, comprising a lower layer of the network protocol with a communication function, and an upper layer of the network protocol managing at least the communication function of the lower layer; and a dominated nodes connected to the serial bus, comprising a lower layer of a network protocol, an application that transmits/receives data to/from other application of the other dominated node by using the lower layer, a preset device that stores management information for managing the lower layer, a setting device that enables the application to communicate with the other application of the other dominated node without an upper layer of the network protocol by setting the lower layer with the managing information read from the preset device at the time of a configuration of the communication network, a detecting device that detects a connection of the general node to the serial bus, and a suspending device that suspends a function obstructing a normal operation of the general node when the detecting device detects the connection of the general node to he serial bus.

According to yet another aspect of the present invention, there is provided a communication network system, comprising: a serial bus; a dominated nodes connected to the serial bus, comprising a lower layer of a network protocol with a communication function, an application that transmits/receives data to/from other application of the other node by using the lower layer, a preset device that stores management information for managing the lower layer, and a setting device that enables the application to communicate with the other application of the other node without an upper layer of the network protocol by setting the lower layer with the managing information read from the preset device at the time of a configuration of the communication network; and a dominating node being capable of connecting to the serial bus, comprising a lower layer of the network protocol with a communication function, an upper layer of the network protocol that manages at least the communication function of the own lower layer and can also manage the communication function of the lower layer of the dominated node for making the application of dominated node establish a communication with the other application of the other node.

According to the present invention, a preset device that stores management information for setting the communication function of the lower layer is provided to a communication apparatus that forms one node, and it can perform a communication with only a lower layer and without a dominating node. Therefore, the dominating node is not necessary normally. Also, when the dominating node is connected to the network, the dominating node can manage the lower layer of the dominated node that equips only with the lower layer. Also, the dominating node can reset the management information in the preset device of the dominated node, and connecting the dominating node to the serial bus can change a network structure among the devices. Moreover, when the function of the dominated node obstructs to an operation of the general node connected to the network, the function of the dominated node can be suspended automatically.

DETAILED DESCRIPTION OF THE PREFERRED EMBODIMENTS

Figure 1:
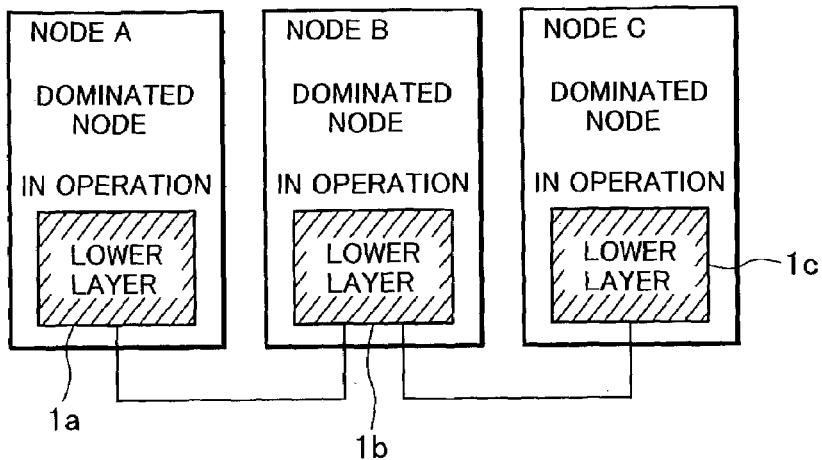
FIG. 1 is a diagram showing a structure of a network system constituted of communication apparatuses as dominated nodes according to an embodiment of the present invention.

The structure of the network system that equips with the communication apparatus as the dominated node according to the embodiment of the present invention is shown in FIG. 1.

The network system shown in FIG. 1 is consisted of the IEEE 1394 bus as a rapid serial bus, and an IEEE 1394 device that equips with a predetermined IEEE 1394 interface is provided to the IEEE 1394 bus stably. In this case, a request, such as an audio signal and a controlling signal in the IEEE 1394 devices, of an application is satisfied only with a function of the lower layer. Further, an IEEE 1394 device other than the predetermined IEEE 1394 device is not connected to the same IEEE 1394 bus, and the network system does not need to change a network structure such as transmissions between the IEEE 1394 devices. In this network system, the IEEE 1394 device has a structure being stably connected to the IEEE 1394 bus. Although the structure is changed, the request of the application is satisfied without the upper layer when the operation can be continued by the function that is included in the lower layer.

In the network system shown in FIG. 1, the IEEE bus is established with the daisy chain connection among the dominated node (node A) that equips only with the lower layer 1a, the dominated node (node B) that equips with only the lower layer 1b and the dominated node (node C) that equips only with the lower layer 1c with the IEEE 1394 cable. The lower layers 1a, 1b and 1c equip with the functions to execute transaction and the like such as the isochronous transmission/reception, read/write of memory and the like. Also, in the node A and the node C that are the dominated nodes, the preset device for storing information of the operation of the lower layer to the dominated node and initializing is provided in the lower layer. The preset device stores management information which is written in the function register of the function device corresponding to the connection settings such as reception channel and the like and the commands such as volume control and the like. Then the management information is read from the preset device at a time of an IEEE 1394 bus setting such as a time of power on and a bus reset and is set in each of the function registers of the function device of the lower layer.

By that, the node A and the node C that are the dominated nodes do not need the upper layer that manages each of the lower layers 1a to 1c of the node A and the node C, and communication among the nodes can be performed. In the network system according to the present invention, however, only the node A and the node C that are the dominated nodes without the upper layer are connected to the IEEE 1394 bus to construct the network system, the dominated nodes A and C perform everything normally. That is, in the network system shown in FIG. 1, as it is considered that the whole bus works normally, the nodes A and C equipped only with the lower layer continue the operation of the determined functions (data transmission and the like) based on the function register set by the preset device. In this case, the compatibility of the upper protocol can be maintained only by equipping the lower layer in the dominated nodes A and C, and a bus structure and a bandwidth of the data transmission can be dynamically changed.

In the network system shown in FIG. 1, a network structure of logical connections of the dominated node A, the dominated node B and the dominated node C are determined by the management information stored in the preset device provided in each of the dominated nodes in advance. Although this management information is set by a factory setting, when the network structure is necessary to be changed, the dominating node equipped with the upper and lower layers on the IEEE 1394 bus is connected so that the dominating node rewrites the management information stored in the preset device of each dominated node. Then, a network system with a new network structure can be established by executing a bus reset and an initial setting of the IEEE 1394 bus. Also, a setting device such as a DIP switch is provided in the dominated node, and the management information stored in the preset device of the dominated node may be rewritten manually by using the setting device.

Figure 2:
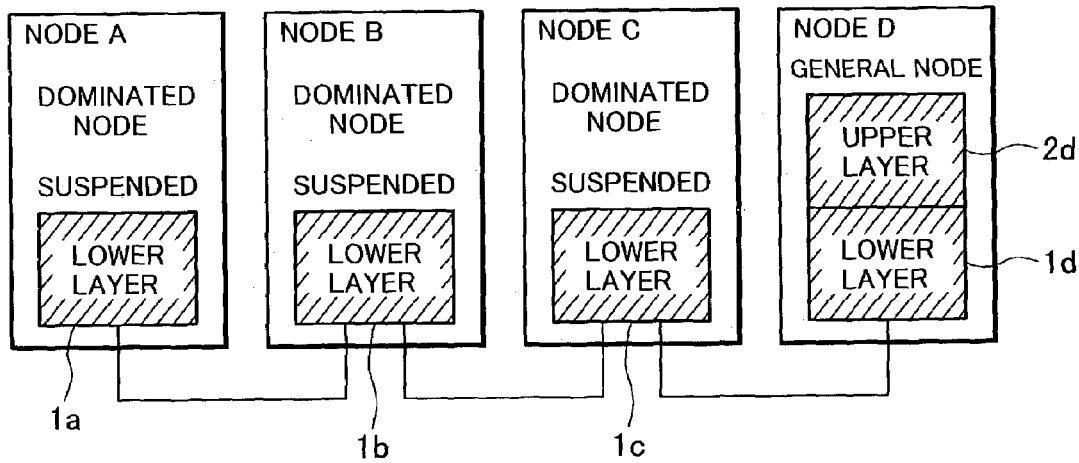
FIG. 2 is a diagram showing a second structure of a network system constituted of communication apparatuses as dominated nodes according to the embodiment of the present invention.

Next, the second network system structure according to the embodiment of the present invention is shown in FIG. 2

In the network system shown in FIG. 2, the IEEE bus is established with the daisy chain connection among the dominated node (node A) that equips only with the lower layer 1a, the dominated node (node B) that equips only with the lower layer 1b and the dominated node (node C) that equips only with the lower layer 1c with the IEEE 1394 cables. In this case, the above-described preset device is equipped to each of the dominated nodes A and C. The management information of the preset device is read at a time of an IEEE 1394 bus setting such as a time of power on and a bus reset and is set each of the function registers in the lower layer. Then, the dominated nodes A and C do not need a node equipped with the upper layer that manages each of the lower layers 1a to 1c of the node A and the node C, and communication between the dominated nodes can be performed. However, in this network system, the general node (node D) is connected to the network system, the function set by the preset device of the dominated nodes A and C which do not equip with the upper layer may obstruct a function of the general node (node D). For example, when a network resource obtained by the general node (node D) in accordance with a right arbitration based on the protocol conflicts with a network resource preset by the preset device of a dominated node, the dominated node may obstruct a function of the general node (node D). Then, a function to observe a configuration of the IEEE 1394 bus is to be equipped to at least one of the dominated nodes A and C, and the function of the node A or C which obstruct the function of the general node (node D) is suspended when the dominated node detects that the general node is connected to the IEEE 1394 bus. The "suspend" does not mean to suspend all the functions of the dominated node and the lower layer, and it means to suspend a predetermined part of the functions such as the isochronous transmission.

Figure 3:
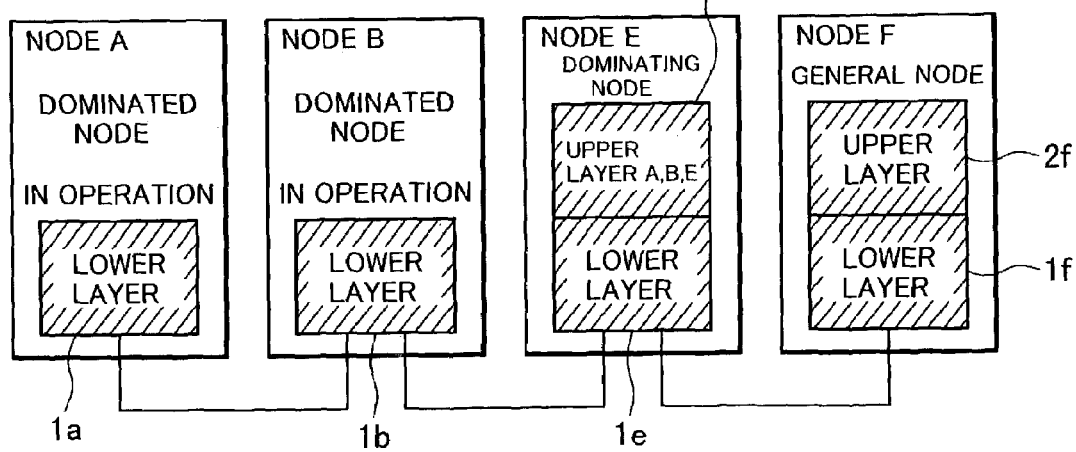
FIG. 3 is a diagram showing a third structure of a network system constituted of communication apparatuses as dominated nodes according to the embodiment of the present invention.

Next, the third network system structure according to the embodiment of the present invention is shown in FIG. 3.

In the network system shown in FIG. 3, the IEEE bus is established with the daisy chain connection among the dominated node (node A) that equips only with the lower layer 1a, the dominated node (node B) that equips only with the lower layer 1b, a dominating node (node E) that equips with an upper layer 2e that serves as both the lower layer 11e and the upper layer of the dominated node A and C and a general node (node F) that equips with a lower layer 1f and an upper layer 2f with the IEEE 1394 cables. In this case, the above-described preset device is equipped to each of the dominated nodes A and B. In this network system, the upper layer 2e in the dominating node (node E) has a function of the proxy upper layers A and B for managing the lower layers 1a and 1b of the dominated nodes (node A and node B) in addition to its own upper layer E. By the upper layer 2e as a proxy of the upper layers of the dominated nodes (node A and node B), compatibilities of the upper protocol in the dominated nodes (node A and node B) are maintained. As the result, the dominated nodes A and B can communicate with the general node (node F) by using the protocol defined by the upper layer. In this network system, the dominated nodes (node A and node B), the dominating node (node E) and the general node (node F) can normally operate all the functions.

A function module consisted of the later-described software Enabler operates in order to make the dominating node operate as described above. The function module Enabler is provided on the upper layer of the dominating node. Also, a function module consisted of the later-described software called Transporter operates in order to make the dominated node operate as described above. The function module called Transporter is provided on the lower layer of the dominated node.

Figure 4:
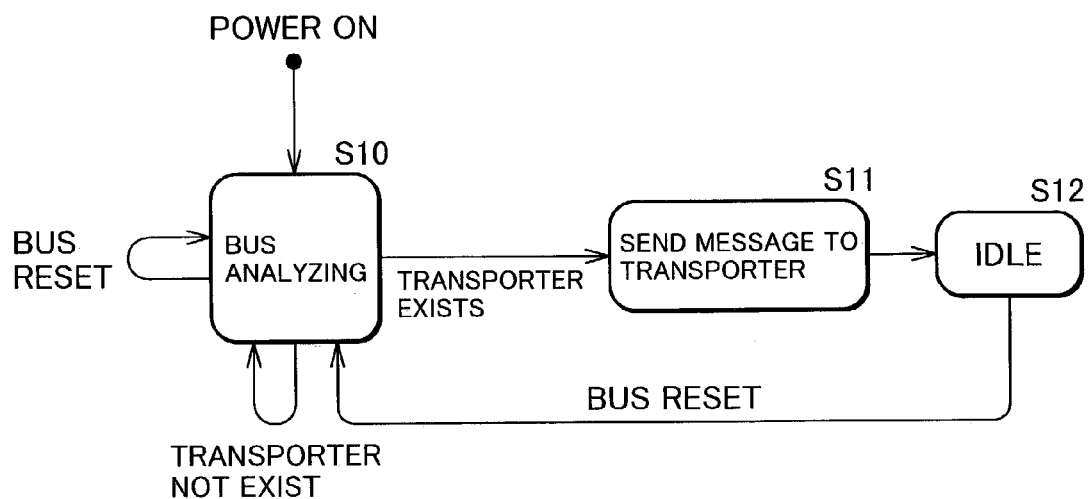
FIG. 4 is a status transition diagram of a functional module Enabler of the dominating node equips in the network system according to the embodiment of the present invention.

The functional module Enabler that the dominating node equips with is explained with reference to the status transition diagram shown in FIG. 4.

When power on and a bus reset of the dominating node are operated, the function module Enabler becomes in a bus analyzing state (S10), and it is judged whether there is a dominated node that the dominating node should manage on the IEEE 1394 bus. When it is judged there is a dominated node, the dominating node sends a message to the function module Transporter of the dominated node within a predetermined time, for example, 1 second, from the power on or the bus reset (S11). It notifies the existence of the dominating node to the dominated node. Then the function module Enabler becomes in a stand-by state (S12). When a bus reset is operated here, the Enabler returns to the bus analyzing state at S10, and the process described in the above is executed again. Moreover, the existence of the dominated node on the IEEE 1394 bus in the bus analyzing is executed by detecting the function module Transporter of the dominated node. When the function module Transporter is not detected, the bus analyzing at S10 is repeated until it is detected.

Figure 5:
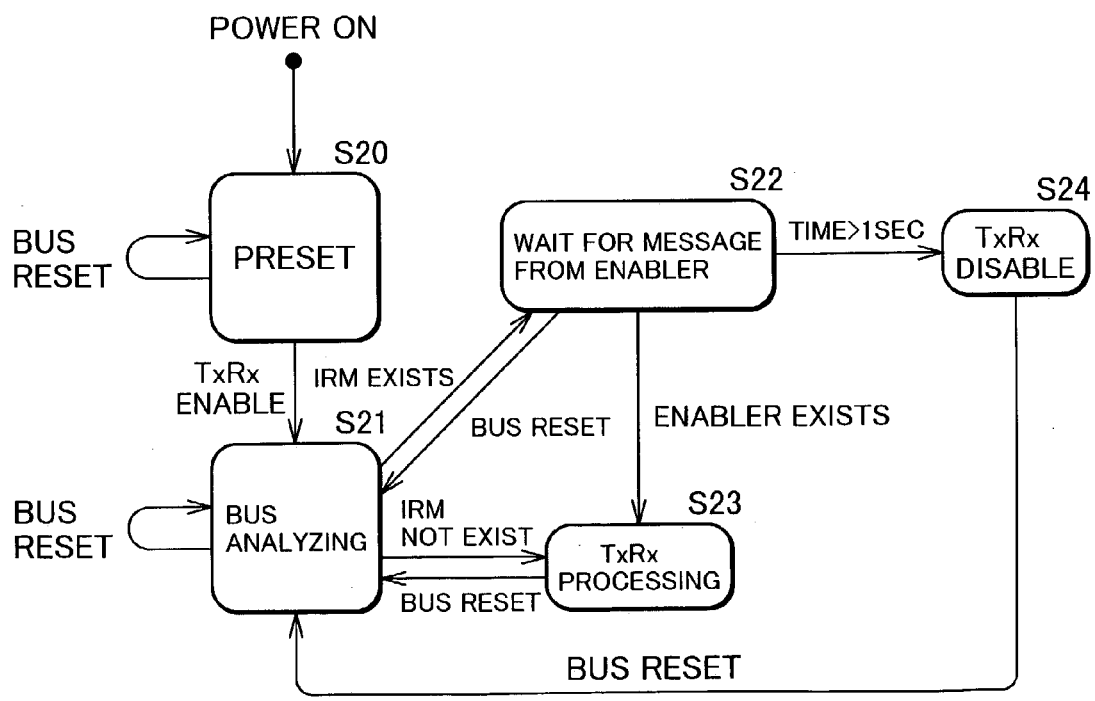
FIG. 5 is a status transition diagram of a functional module Transporter of the dominated node equips in the network system according to the embodiment of the present invention.

The functional module called Transporter that the dominated node equips with is explained with reference to the status transition diagram shown in FIG. 5.

When a dominated node is turned on or a bus reset is transmitted, the function module Transporter reads management information consisted of an initializing data for a communication function (a packet handler) executing transmission/reception of audio and MIDI signals kept in its own preset device such as the programmable ROM, etc. and presets the read management information to the packet handler (S20). By that, the dominated node can execute the isochronous transmission and reception (TxRx Enable). When the preset process at S20 is completed or the function module is in the bus analyzing state (S21) by a bus reset, it is judged whether there is an isochronous resource manager (IRM) on the IEEE 1394 bus or not. When the node transmits an isochronous data by the isochronous transmission, the node needs to obtain network resources such as a channel and a bandwidth from the IRM. That is, the IRM manages network resources such as a channel and a bandwidth of the IEEE 1394 bus, and either one of the nodes having both the upper layer and the lower layer on the IEEE1394 bus is in charge of that function.

When it is judged there is the IRM on the IEEE 1394 bus, there should be the dominating node or the general node to execute a general isochronous transmission on the IEEE 1394 bus. After resetting a timer, information from the function module Enabler of the dominating node is waited (S22). If there is no information from the function module Enabler of the dominating node after elapsing a predetermined time, for example 1 second, the status is kept until a bus reset is going into effect (S24). Also, if there is information from the function module Enabler of the dominating node before elapsing the predetermined time, for example 1 second, it is judged there is a dominating node. The isochronous transmission and reception is continued (TxRx Enable), the status is changed to be managed by the dominating node to be in the state until a bus reset is going into effect (S23). Further, if there is no IRM on the IEEE 1394 bus, the isochronous transmission and reception is continued (TxRx Processing), and the status is kept until a bus reset is going into effect (S23). By that, although only the dominated nodes are connected on the IEEE 1394 bus, the isochronous transmission and reception can be executed.

Further, the status transition diagram showing the operations of the above-described function modules Enabler and Transporter in the dominating node is one of examples, and the present invention is not limited to that.

Figure 6:
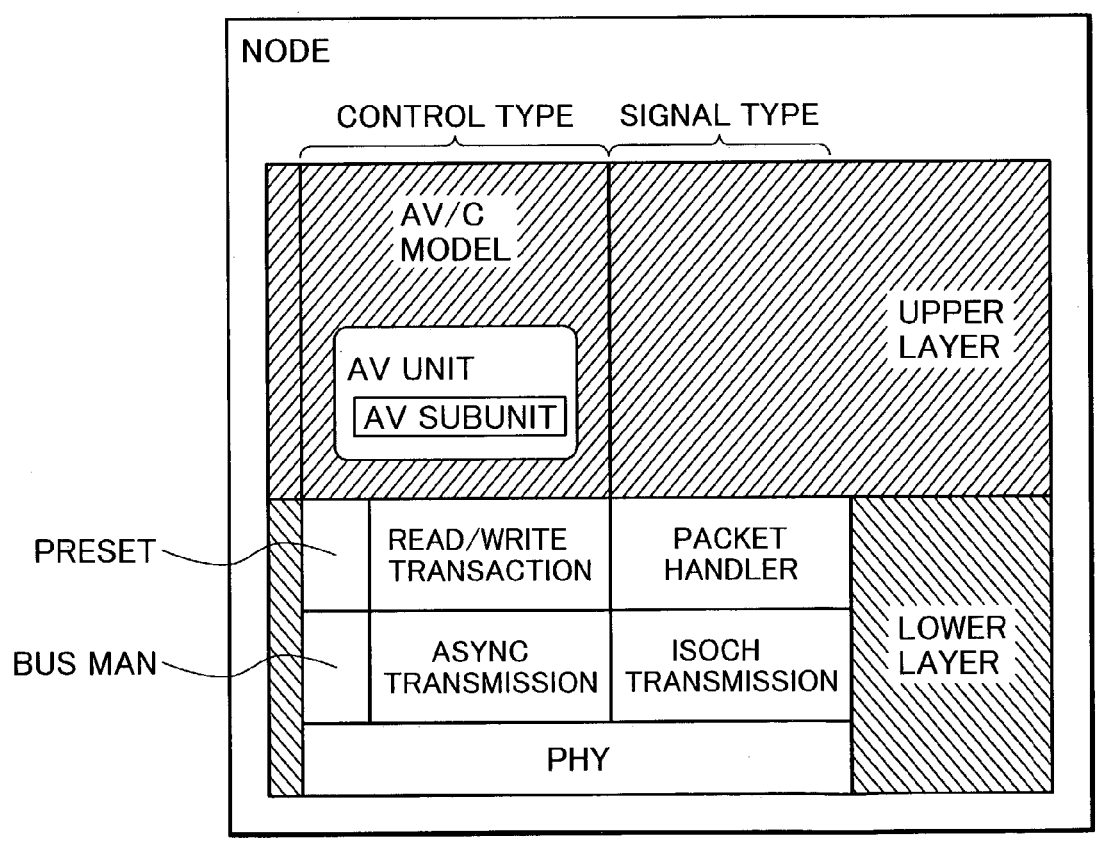
FIG. 6 is a diagram showing a typical protocol structure at the time when the dominated node is an AV device in the network system according to the present invention.

A typical protocol structure at the time when the dominated node A or C is an AV device is shown in FIG. 6.

In the protocol structure shown in FIG. 6, each structure is represented with being classified into the lower layer and the upper layer and into the control-type and the signal-type. A control type lower layer is formed of the physical layer, the asynchronous transmission function, a read/write transaction, bus management and the preset device that is special in the present invention.

The physical layer is a layer for executing a signal process between an electric signal that executes transmission and reception and the asynchronous transmission function. Here, a physical interface regulation of a connector, a cable and the like, an electric interface regulation of an encoding/decoding that executes an analogue/digital conversion of a logical signal that is used by the asynchronous transmission function and a signal level that determines an electric level of a communication signal, an arbitration for determination of a communication node, resynchronization of a communication clock, initializing detection of the bus and the like are executed. The physical interface in the physical layer and the electric interface in the electric layer are regulated, and the physical layer is generally made of hardware.

The asynchronous transmission function is a function provided by the link layer, and it executes an address assignment, a data check, a packet transmission/reception that performs flame distribution of data and a cycle control concerning to the asynchronous transmission. The read/write transaction is the read transaction and the write transaction executed based on the asynchronous transmission provided by the transaction layer by using the function of the link layer. The read transaction reads a data with a designated data length from a target address of the target node, and writes the data with the designated data length to the target address of the target node.

Also, the bus management includes management of power supplies, management of a topology map and a speed map, management of isochronous resources, and the like. The bus management includes a configuration ROM, a control and status register (CSR) and the like. Further, a register for presetting is equipped in the preset device, and management information which is written in the function register corresponding to the commands such as connection setting of a reception channel, volume control and the like is stored. For example, the management information is read from the preset device at the time of a bus reset to be set to each function register in the lower layer.

Also, the control type upper layer is formed of, for example, a audio/video control (AV/C) model, the dominated node that is a communication apparatus according to the present invention does not equip with the AV/C model that is the upper layer. Further, the upper layer AV/C model is formed of the AV unit that is the AV device, and the AV unit has an AV sub-unit in charge of the functions of AV devices. An AV/C command and a transaction set are equipped in the AV unit, and the AV/C command is a command set that remote-controls the AV device connected to the IEEE 1394 bus. In the dominated node that is the communication apparatus according to the present invention, if the control type upper layer is not equipped, the isochronous transmission for communicating between predetermined nodes, a memory read/write based on the isochronous transmission and a data exchanging function by an asynchronous stream can be realized by setting management information stored in the preset device to the function register of the function device on the lower layer.

On the other hand, the signal type is formed of only the lower layer, and the lower layer is formed of the physical layer described above, the isochronous transmission function provided by the link layer and the packet handler provided by the link layer. The signal type having this structure is a part that deals with an audio signal, a video signal and the MIDI signal by the isochronous transmission, and it is general to be equipped by using hardware because a rapid transaction is needed.

Figure 7:
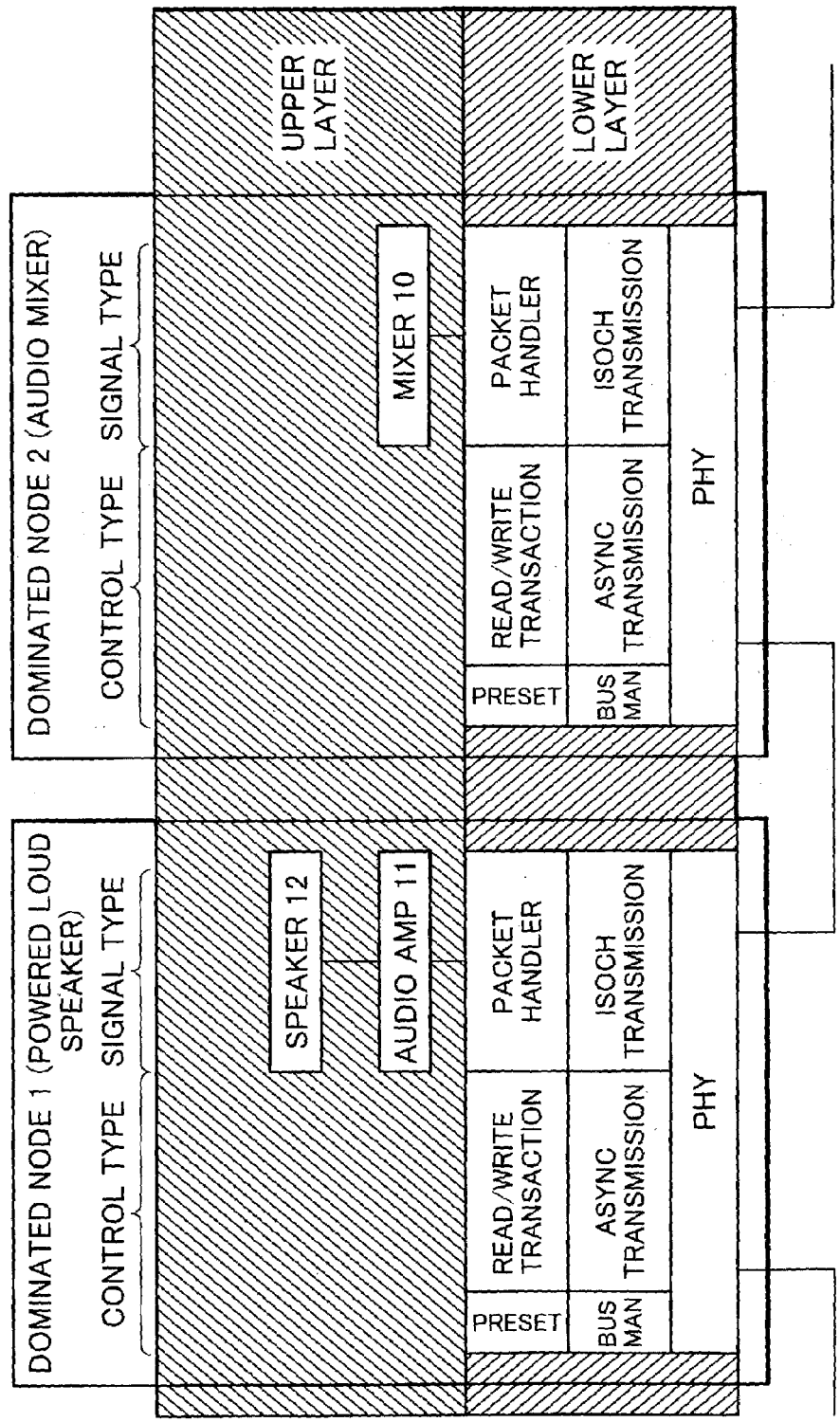
FIG. 7 is a diagram showing an example of a structure of the network system to which the node shown in the protocol structure connects in the network system according to the present invention.

The example of a structure of the network system to which the node shown in the protocol structure is connected is shown in FIG. 7. In this structure example, the dominated node 1 is a powered loud speaker, and the dominated node 2 is an audio mixer. An example that the sound signal to be sounded is transmitted from the dominated node 2 to the dominated node 1 is shown.

The dominated node 1 of the IEEE 1394 device that is the powered loud speaker and the dominated node 2 that is the audio mixer providing the sound signal to the dominated node 1 (the powered loud speaker) are stably provided on the network, the sound signal is stably transmitted between the nodes by setting management information stored in the preset device to the packet handler. That is, the isochronous transmission of the sound signal to be sounded from the dominated node 2 (the audio mixer) to the dominated node 1 (the powered loud speaker) is executed only with the lower layers that equip with the preset devices. That is, the dominated node 1 (the powered loud speaker) equips only with the lower layer without the upper layer, and the dominated node 2 (the audio mixer) also equips only with the lower layer without the upper layer.

In the network system shown in FIG. 7, the sound signal from a mixer 10 that is a signal type application in the dominated node 2 is received in the dominated node 1 with the isochronous transmission by the function of the lower layer that equips with the above-described preset device. Then, the sound signal received in the dominated node 1 is transmitted from the lower layer to an audio amp 11 that is a signal type application in order to be amplified, and the amplified sound signal is sounded from a speaker 12.

In the data packet communication in the IEEE 1394, an address of data writing and reading to the connected IEEE 1394 device is represented with a 64 bits address based on the IEEE 1212. The register space is shown in FIG. 8.

Figure 8:
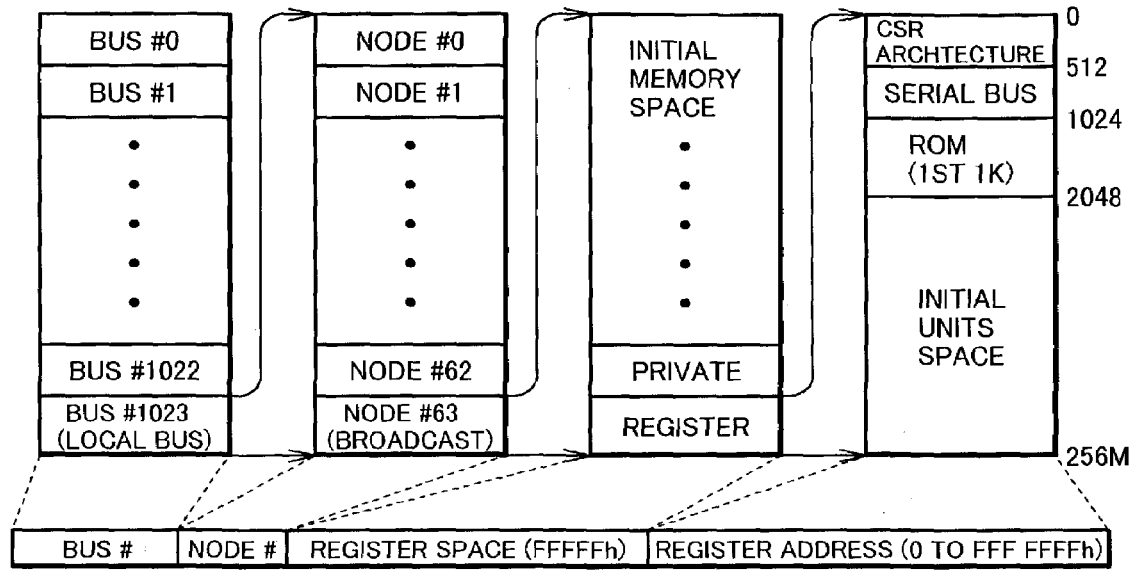
FIG. 8 is a diagram showing a register space structure in the network system according to the present invention.
Figure 9:
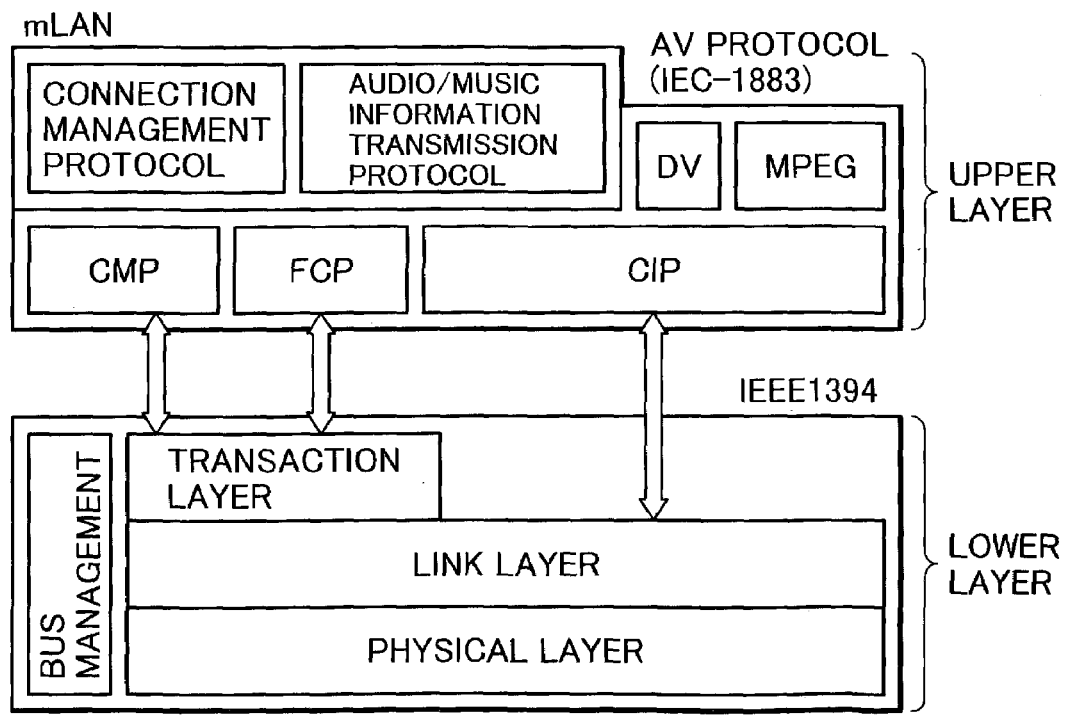
FIG. 9 is a diagram showing an example of a protocol compared to the OSI referring model of the IEEE 1394.
Figure 10:
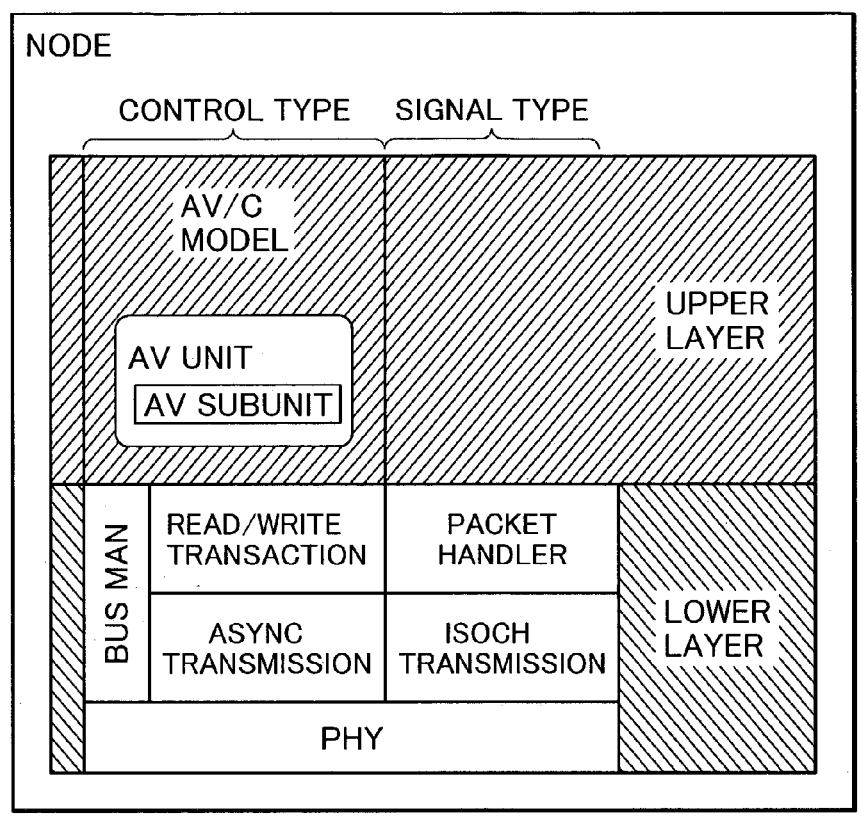
FIG. 10 is a diagram showing a protocol of an AV device having a typical IEEE 1394 bus.
Figure 11:
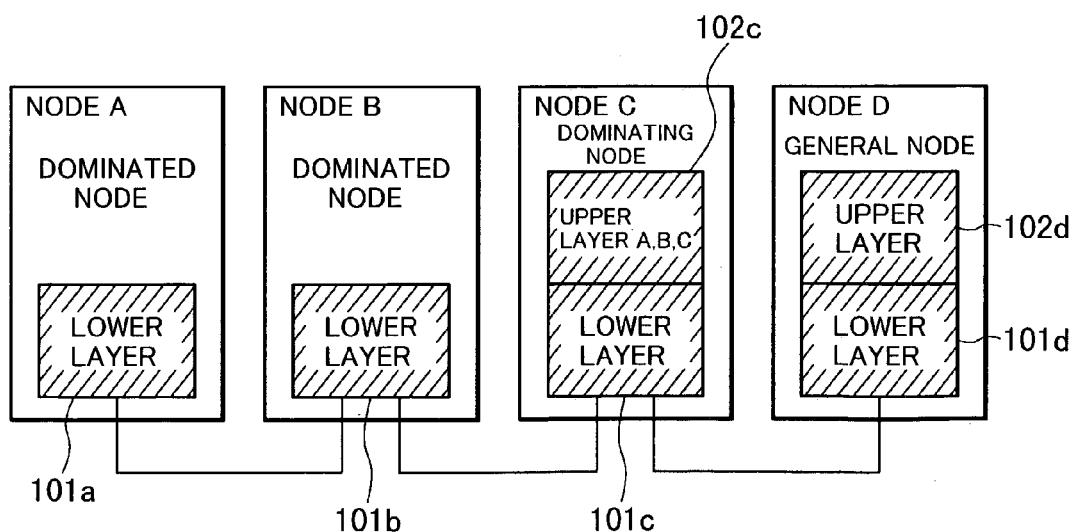
FIG. 11 is a diagram showing a structure of a network system adopting the suggested IEEE 1394 bus.

In the register space shown in FIG. 8, upper 10 bits of 64 bits represent a bus number (bus ID), and a bus up to a bus number 1023 can be addressed. 6 bits after the bus number represent a node number (phy LD), and 63 nodes can be connected to one bus. With a node ID of 16 bits containing the bus number and the node number enables connection of the maximum 64,449 IEEE 1394 devices theoretically.

48 bits following to the node ID represent an address in the IEEE 1394 device. Register spaces of upper 20 bits of the 48 bits are roughly classified into an initial memory space, a private space and an initial register space. The initial register space is divided into the control and status register, architecture, the serial bus, the configuration ROM and an initial unit space by the following register address of 28 bits. Unique information of the IEEE 1394 device is written in the configuration ROM in the initial register space. A fact that the node is an IEEE bus node, a corresponding upper protocol, etc. can be deduced by the information.

The preset device is realized by a re-writable programmable ROM, and an address of the programmable ROM is assigned to either one of the control and status register architecture, the serial bus, the configuration ROM or the initial unit space. When the management information stored in the preset device is re-written, the dominating node executes a lock transaction to the address space assigned by the preset device to rewrite the management information.

According to the above-described network system according to the present invention, when an upper layer uses a higher version IEEE 1394 Standard, the dominated node that is managed by the dominating node can be renewed to the higher version by connecting the dominating node with the renewed upper layer to the IEEE 1394 bus. Further, a network topology of an IEEE 1394 bus can be not only the daisy chain but also any types of topology such as a tree type or a star type.

Moreover, the dominating node can be realized by computers such as a personal computer and the like.

As explained in the above, according to the present invention, a preset device that stores management information for setting the communication function of the lower layer is provided to a communication apparatus that forms one node, and it can perform a communication with only a lower layer and without a dominating node. Therefore, the dominating node is not necessary normally. Also, when the dominating node is connected to the network, the dominating node can manage the lower layer of the dominated node that equips only with the lower layer. Also, the dominating node can reset the management information in the preset device of the dominated node, and connecting the dominating node to the serial bus can change a network structure among the devices. Moreover, when the function of the dominated node obstructs to an operation of the general node connected to the network, the function of the dominated node can be suspended automatically.

The present invention has been described in connection with the preferred embodiments. The invention is not limited only to the above embodiments. It is apparent that various modifications, improvements, combinations, and the like can be made by those skilled in the art.

What are claimed are:

1. A communication apparatus as a dominated node and connected to a serial bus that serially transfers a signal constituting a communication network, the apparatus comprising:

a lower layer of a network protocol stack for providing an asynchronous transmission function and an isochronous transmission function to communicate with another node connected to the communication network, wherein the lower layer includes a function register for storing managing information being provided by an upper layer of a dominating node, and isochronous transmission and reception status of the isochronous transmission function of the lower layer is controlled by the managing information stored in the function register;

an application that transmits and receives data to and from another application of the another node by using the isochronous transmission function of the lower layer;

a preset device that stores the managing information for controlling the isochronous transmission and reception status of the isochronous transmission function of the lower layer, the managing information being set by the upper layer of the dominating node at a certain timing during the dominating node is connected to the communication network; and a setting device that enables, by setting the managing information read from the preset device to the function register of the lower layer, the application to communicate with the another application of the another node by using the isochronous transmission function at the time of turning the communication apparatus on or bus reset of the communication network, wherein the dominating node includes the upper layer of the network protocol stack that processes a command of an upper layer protocol received by the asynchronous transmission function via the communication network, sets the managing information to the function register of the lower layer of the apparatus, and writes the managing information into the preset device of the apparatus via the communication network, at a certain timing during the dominating node is connected to the communication network, and the apparatus has no upper layer that processes a command of the upper layer protocol received by the asynchronous transmission function via the communication network, writing the management information into the function register of the lower layer.

2. A communication apparatus according to claim 1, wherein a general node comprising a lower layer of the network protocol stack with an asynchronous transmission function and an isochronous transmission function, and an upper layer of the network protocol stack managing at least the isochronous transmission function of the lower layer could be connected to the communication network, and the communication apparatus further comprising a detecting device that detects a connection of the general node to the communication network, a judging device that judges if there is the dominating node connected to the communication network or not, and a suspending device that suspends the isochronous transmission function of the lower layer that obstructs a normal operation of the general node when the detecting device detects the connection of the general node to the communication network, and the judging device judges there is no dominating node connected to the communication network.

3. A communication apparatus according to claim 1, wherein the preset device consists of a re-writeable ROM.

4. A communication network system, comprising:

a serial bus that serially transmits a signal;

a dominated node connected to the serial bus, comprising a lower layer of a network protocol stack that provides an asynchronous transmission function and an isochronous transmission function to communicate with another node connected to the communication network, wherein the lower layer includes a function register for storing managing information being provided by an upper layer of a dominating node, and isochronous transmission and reception status of the isochronous transmission function of the lower layer is controlled by the managing information stored in the function register, an application that transmits and receives data to and from another application of the another node by using the isochronous transmission function of the lower layer, a preset device that stores the managing information for controlling the isochronous transmission and reception status of the isochronous transmission function of the lower layer, the managing information being set by the upper layer of the dominating node at a certain timing during the dominating node is connected to the communication network, and a setting device that enables, by setting the managing information read from the preset device to the function register of the lower layer, the application to communicate with the another application of the another node by using the isochronous transmission function at the time of turning the communication apparatus on or bus reset of the communication network; and a dominating node adopted to be connected to the serial bus, comprising a lower layer of the network protocol stuck with a transmission function, an upper layer of the network protocol stuck that manages at least the transmission function of own lower layer and that is adopted to manage the transmission function of the lower layer of the dominated node for making the application of the dominated node establish a communication with the another application of the another node by processing a command of an upper layer protocol received by the asynchronous function via the communication network, the upper layer writing the management information into the function register of the lower layer of the dominated node, and wherein the dominated node has no upper layer.

5. A communication apparatus according to claim 4, wherein the preset device consists of a re-writeable ROM.

6. A communication network system comprising a communication network for serially transferring a signal and a dominated node connected to the communication network and a dominating node connected to the communication network, wherein the dominated node comprising:

a lower layer of a network protocol stack that provides an asynchronous transmission function and an isochronous transmission function to communicate with the dominating node and another node connected to the communication network;

an application that transmits and receives data to and from another application of the another node by using the isochronous transmission function of the lower;

a preset device that stores the managing information for controlling the isochronous transmission and reception status of the isochronous transmission function of the lower layer, the managing information being set by the upper layer of the dominating node at a certain timing during the dominating node is connected to the communication network; and a setting device that enables, by setting the managing information read from the preset device to the lower layer, the application to communicate with the another application of the another node by using the isochronous transmission function at the timing of the dominated node being turned on or bus reset of the communication network being occurred, and wherein the dominating node comprising:

a lower layer of a network protocol stack that provides an asynchronous transmission function and, an isochronous transmission function to communicate with the dominated node and the another node connected to the communication network, the upper layer of the network protocol stack that processes a command of an upper layer protocol received by using the asynchronous transmission function via the communication network, controls the lower layer of the dominating node, sets the managing information to the lower layer of the dominated node, and writes the managing information into the preset means of the dominated node via the communication network at a certain timing during the dominating node is connected to the communication network, and characterized in that an upper layer for the dominated node for processing the command of the upper layer protocol received by the asynchronous transmission function via the communication network; and writing the management information to the lower layer of the dominated node is equipped in dominating node.

7. The communication network system according to claim 6 wherein
the lower layer includes a function register that stores managing information being provided by an upper layer of the dominating node, and isochronous transmission and reception status of the isochronous transmission function of the lower layer is controlled by the management information stored in the function register,
the setting device of the dominated node enables the application by setting the managing information to the function register of the lower layer, and
the upper layer sets the managing information to the function register of the lower layer of the dominated node.

8. A communication apparatus according to claim 6, wherein the preset device consists of a re-writeable ROM.

9. A communication apparatus as a dominated node, connected to a serial bus that serially transfers a signal constituting a communication network comprising the dominated node and a dominating node, the apparatus comprising:
a lower layer of a network protocol stack that provides an asynchronous transmission function and an isochronous transmission function to communication with another node connected to the communication network;
an application that transmits and receives data to and from another application of the another node by using the isochronous transmission function of the lower layer;
a preset device that stores the managing information for controlling the isochronous transmission and reception status of the isochronous transmission function of the lower layer, the managing information being set by the upper layer of the dominating node at a certain timing during the dominating node is connected to the communication network; and a setting device that enables, by setting the managing information read from the preset means to the lower layer, the application to communicate with the another application of the another node by using the isochronous transmission function at the timing of the dominated node being turned on or bus reset of the communication network being occurred, and wherein the dominating node includes the upper layer of the network protocol stack that processes a command of an upper layer protocol received by the asynchronous transmission function via the communication network, sets the managing information to the lower layer of the apparatus, and writes the managing information into the preset device of the apparatus via the communication network, at a certain timing during the dominating node is connected to the communication network, and characterized in that an upper layer for the dominated node for processing the command of the upper layer protocol received by the asynchronous transmission function via the communication network and writing the management information to the lower layer of the dominated node is equipped in the dominating node.

10. A communication apparatus according to claim 9, wherein the preset device consists of a re-writeable ROM.

* * * * *